United States Patent
Dunham et al.

(10) Patent No.: US 10,449,907 B2
(45) Date of Patent: Oct. 22, 2019

(54) STORAGE COMPARTMENT AND HANGING STORAGE MODULE HAVING ILLUMINATED TAB

(71) Applicant: Ford Global Technologies, LLC, Dearborn, MI (US)

(72) Inventors: Scott Holmes Dunham, Redford, MI (US); Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 15/227,115

(22) Filed: Aug. 3, 2016

(65) Prior Publication Data
US 2018/0037169 A1    Feb. 8, 2018

(51) Int. Cl.
*B60R 7/08*    (2006.01)
*F21V 23/04*    (2006.01)
*B60Q 3/225*    (2017.01)

(52) U.S. Cl.
CPC ............... *B60R 7/08* (2013.01); *B60Q 3/225* (2017.02); *F21V 23/0471* (2013.01)

(58) Field of Classification Search
CPC ....... B60Q 3/225; F21V 23/0471; B60R 7/04; B60R 7/08

USPC ...................................................... 296/24.34
See application file for complete search history.

(56) References Cited

U.S. PATENT DOCUMENTS

| | | | |
|---|---|---|---|
| 4,986,589 A | 1/1991 | McNew | |
| 5,721,531 A * | 2/1998 | Garver | A47B 63/00 235/385 |
| 5,977,875 A | 11/1999 | Lin et al. | |
| 8,994,534 B2 | 3/2015 | Zhu et al. | |
| 9,238,439 B2 | 1/2016 | Huebner et al. | |
| 2005/0035618 A1 | 2/2005 | Toth et al. | |
| 2015/0022099 A1 * | 1/2015 | Farley | H05B 33/0857 315/161 |
| 2015/0035308 A1 * | 2/2015 | Huebner | B60R 7/04 296/37.8 |
| 2015/0217781 A1 * | 8/2015 | Lee | B60W 50/10 701/1 |

* cited by examiner

Primary Examiner — Joseph D. Pape
Assistant Examiner — Dana D Ivey
(74) Attorney, Agent, or Firm — Vichit Chea; Price Heneveld LLP (57) ABSTRACT

A vehicle storage compartment includes a support structure, power contacts, and a hanging storage module such as a file folder supported on the support structure and electrically coupled to the power contacts. The module includes a storage pocket, support arms supporting the pocket and configured to be supported on the support structure, and electrical conductors coupled to the contacts. The module further includes a tab comprising a light source and a user input sensor, wherein the light source illuminates storage the module when the user input sensor detects a user input.

20 Claims, 6 Drawing Sheets

STORAGE COMPARTMENT AND HANGING STORAGE MODULE HAVING ILLUMINATED TAB

FIELD OF THE INVENTION

The present invention generally relates to vehicle storage assemblies, and more particularly relates to a storage assembly containing illuminated hanging storage modules such as hanging file folders.

BACKGROUND OF THE INVENTION

Automotive vehicles typically incorporate storage compartments located throughout the interior of the vehicle for retaining and storing objects, such as paper documents, writing instruments, and portable electronic devices. Frequently, storage compartments become cluttered and unorganized. In addition, it is often difficult to view the contents within the storage compartment. It is therefore desirable to provide for a vehicle storage compartment having hanging storage modules that are organized and easy to view by one or more passengers within the vehicle.

SUMMARY OF THE INVENTION

According to one aspect of the present invention, a storage compartment includes a compartment and a hanging storage module supported on a support structure in the compartment and electrically coupled to a power supply. The hanging storage module includes a storage pocket, a support arm connected to the pocket and configured to be supported on the support structure, and a tab comprising a light source and a user input sensor, wherein the light source illuminates the pocket when the user input sensor detects a user input.

According to another aspect of the present invention, a vehicle storage compartment system includes a compartment having a support structure and power contacts and a hanging storage module supported on a support structure in the compartment. The module includes a storage pocket, a support arm connected to the pocket and configured to be supported on the support structure, electrical circuitry coupled to the power contacts, and a tab comprising a light source and a user input sensor, wherein the light source illuminates at least a portion of the pocket when the user input sensor detects a user input.

According to a further aspect of the present invention, a hanging storage module includes a storage pocket, a support member supporting the pocket and configured to be supported on a support structure of a storage compartment, and a tab comprising a light source and a user input sensor, wherein the light source illuminates the pocket when the user input sensor detects a user input.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
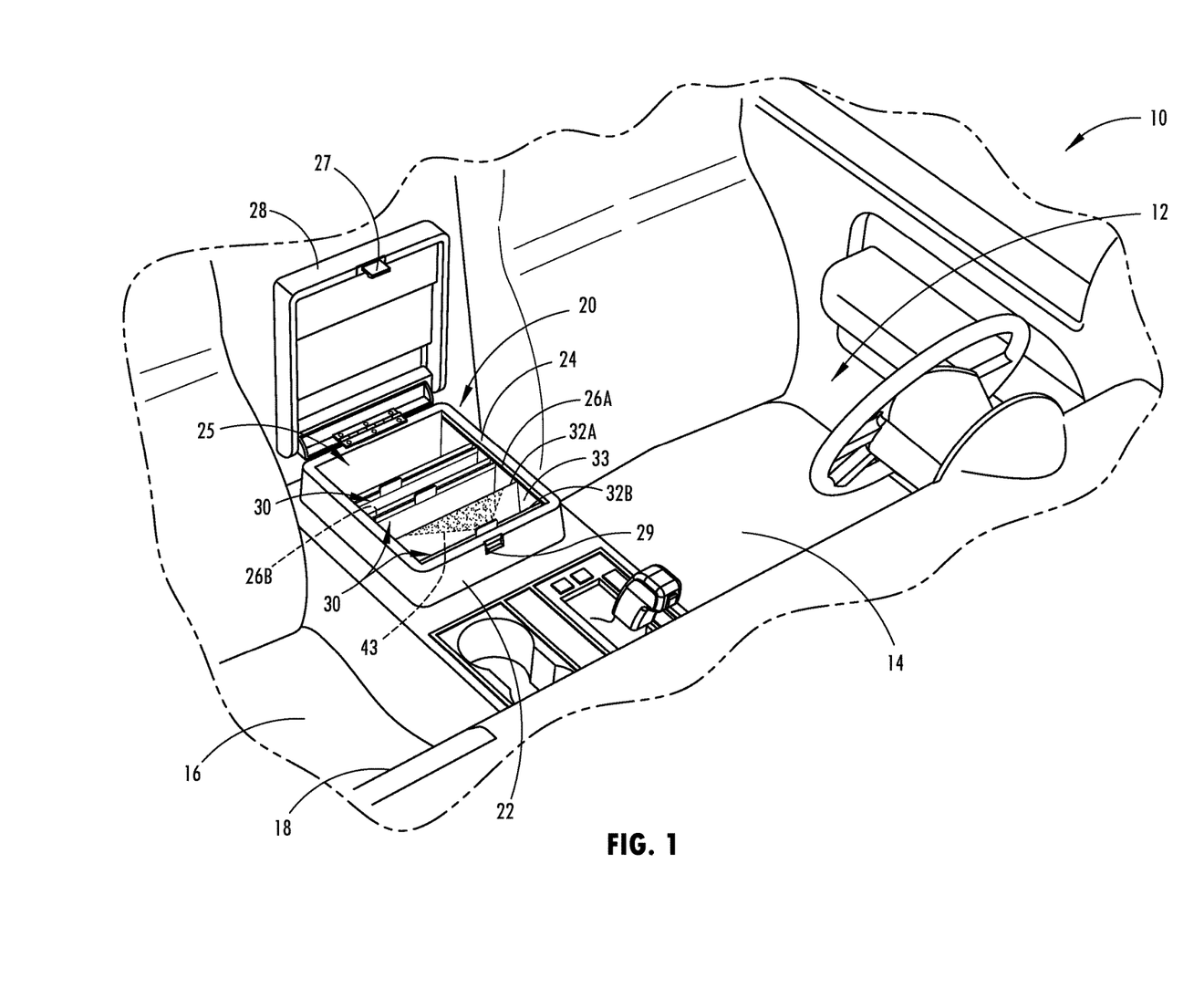
FIG. 1 is an elevated front perspective view of an interior of a vehicle having a storage compartment with hanging storage modules shown as file folders, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-7, reference numeral 10 generally designates an automotive vehicle equipped with a storage compartment 20 that is configured to hold illuminatable hanging storage modules 30 such as illuminatable hanging file folders, according to one embodiment. As shown in FIG. 1, an interior 12 of the passenger compartment of the vehicle 10 is shown in one exemplary configuration having a driver seat 14 laterally spaced from a front passenger seat 16 on opposite left and right sides of the vehicle 10. As generally understood in the art, the storage compartment 20, shown in one embodiment as a center console storage compartment, is arranged longitudinally between the driver seat 14 and the front passenger seat 16 and extends rearward generally from a center stack of the vehicle dash. In the illustrated embodiment, the center console storage compartment 20 is supported by a floor of the vehicle 10 and is situated forward from rear passenger seats in the vehicle 10. As illustrated, the center console storage compartment 20 may be provided in an assembly that includes a shifter and one or more cup holders positioned forward from the storage compartment 20, although it is contemplated that these features may be alternatively positioned on the center console storage compartment 20 or may otherwise not be included on the center console storage compartment 20. It is also contemplated that a front section of the center console storage compartment 20 may not be connected with the center stack and that the storage compartment 20 may be alternatively positioned within other portions of the vehicle 10, such as within a folded seatback of a center seat, a rear-row of seating, a mid-row of seating, a glovebox 18, or other areas that may be configured to include an enclosable storage compartment 20 that can accommodate hanging storage modules.

Figure 2:
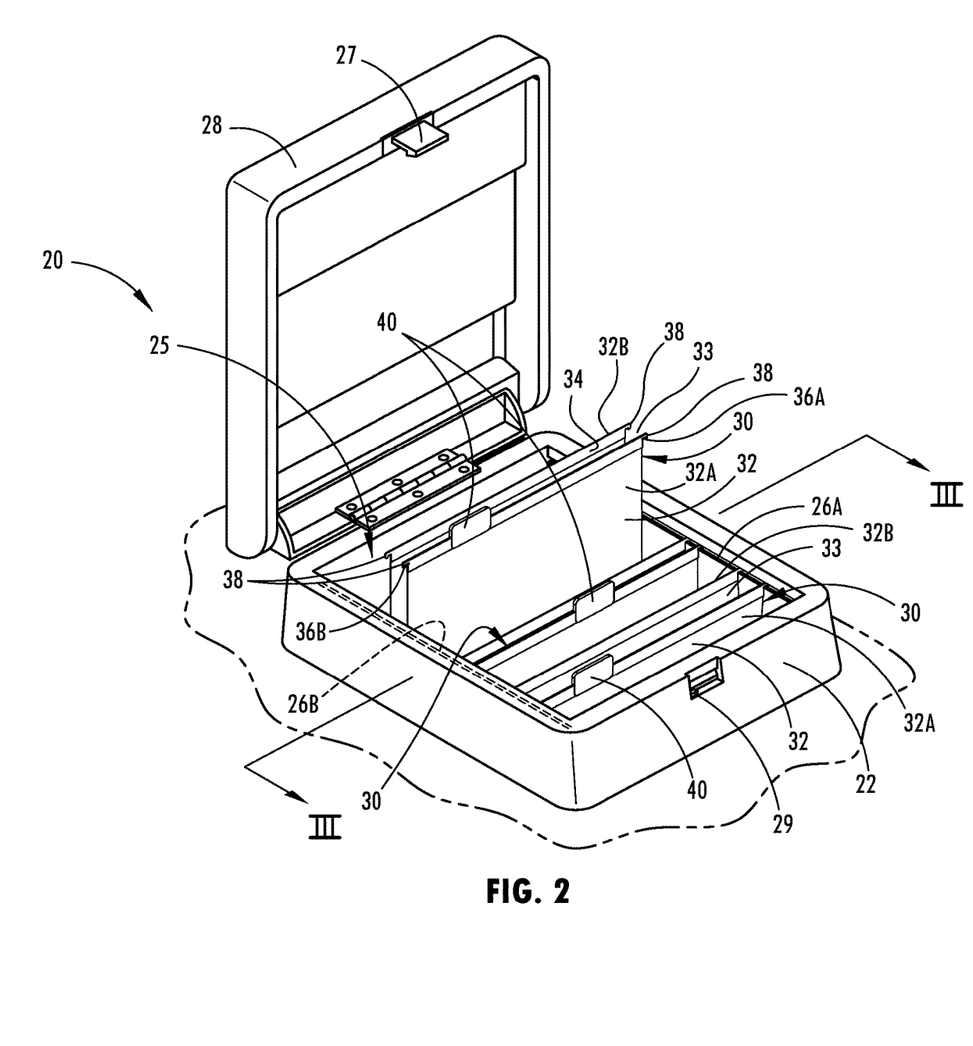
FIG. 2 is an enlarged front perspective view of the storage compartment shown with a file folder partially removed.

As illustrated in FIGS. 1 and 2, the center console storage compartment 20 includes a base 22 generally having four side walls and a bottom defining an interior storage space 25. In the embodiment shown, the base 22 has a generally rectangular cross-sectional shaped configuration. A lid 28 is hingedly connected to the base 22 about a hinge at the top rear end to enable the lid 28 to pivot between an open position as shown and a closed position which covers the base 22 and closes the space 25. Lid 28 may be latchedly closed to the base 22 by a latch 27 at the top front end and opened upon actuation of the latch 27 by a user (e.g., driver or passenger). The compartment 20 may further include a compartment lid switch 29 to detect when the lid 28 is in the open position and provide a closed electrical circuit to conduct electrical current to power circuitry within the storage compartment 20. When the lid 28 is in the closed position, the lid switch 29 provides an open electrical circuit which prevents electrical current from being supplied to the compartment 29. The switch 28 may include a proximity sensor or a mechanical switch.

The center console storage compartment 20 is configured to receive one or more hanging storage modules 30 shown as hanging file folders, according to one embodiment. The center console storage compartment 20 is configured having first and second support rails 26A and 26B extending on opposite sides near an upper end of the base 22. The support rails 26A and 26B extend parallel to each other along a longitudinal direction of the vehicle 10 and are spaced apart at a distance sufficient to receive and support the hanging storage modules 30. It should be appreciated that the support rails 26A and 26B may otherwise be oriented in other directions such as along a lateral direction of the vehicle 10. Each of the first and second support rails 26A and 26B includes an electrically conductive material, such as metal which may be configured to form an electrical contact or contact strip that allows electrical current to flow thereon. One (e.g., first) of the conductive support rails 26A and 26B is supplied with electrical power from the vehicle battery supply and the other (e.g., second) of the electrical conductive rails 26A and 26B is grounded such that electrical current may be supplied via the conductive support rails 26A and 26B to hanging storage modules 30 within the compartment 20. The switch 29 may be arranged in series with one of the conductive support rails 26A and 26B so that electrical power is supplied to the support rails 26A and 26B only when the compartment lid switch 29 detects the lid 28 in the open position.

Figure 3:
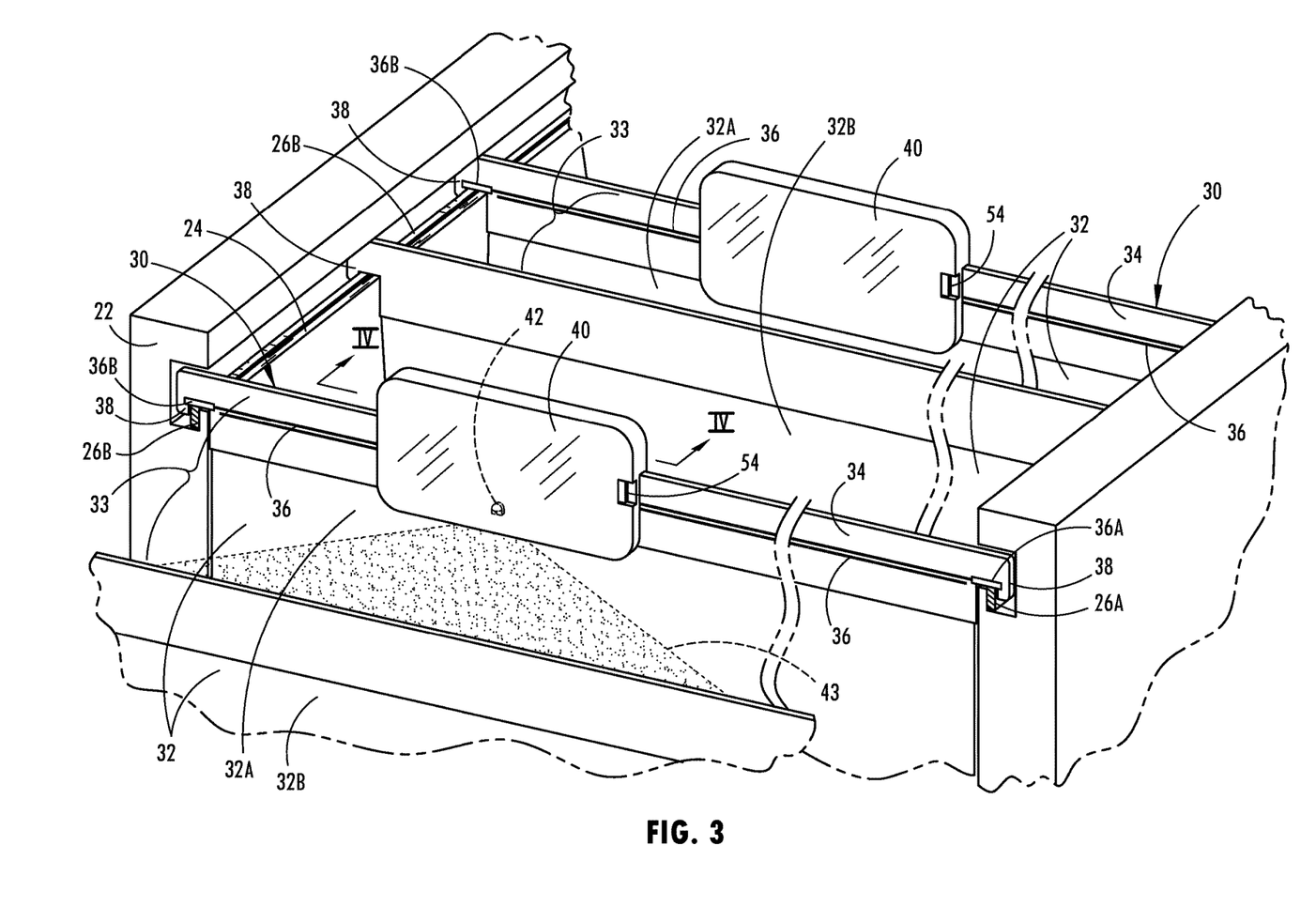
FIG. 3 is an enlarged sectional view of the storage compartment further illustrating the file folders supported on a support structure on the base.

The hanging storage modules 30 are shown in FIGS. 2 and 3 as hanging file folders, each having elongated support arms 38 connected to lower storage portions 32. The support arms 38 are each configured as an elongated member having first and second L-shaped portions 36A and 36B at opposite terminal ends that engage the respective first and second conductive rails 26A and 26B on base 22 in a manner such that the storage module 30 rests on the support rails 26A and 26B and hangs suspended within space 25. It should be appreciated that the lower storage portion 32 may include a U or V-shaped folder according to some embodiments or may include an accordion-style expandable folder according to another embodiment. The lower storage portion 32 defines folder storage pocket or region 33 between first and second walls 32A and 32B of a folded folder material. The first and second walls 32A and 32B may be made of a folder material such as pressed paper or cardboard and connect to the support arms 38 at the upper end. The storage module 30 may be easily disposed within the storage space 25 and supported on the conductive support rails 26A and 26B such that the storage module 30 hangs in a stored position and may be removed by a user from the storage space 25 as shown in FIG. 2.

The support arms 34 extend across the entire top length of the hanging storage module 30 and extend a distance beyond the lower storage portion 32. In addition, the storage module 30 has a tab 40 connected to or formed as part of one of the first and second upper support arms 34. The tab 40 preferably extends above the corresponding support arms 24 so that it is viewable behind other storage modules 30 and may serve as a label or an identifier of the storage module 30. The tab 40 may include indicia printed thereon to uniquely identify the particular storage module or the contents stored therein and the tab 40 may be illuminated as described herein.

Figure 4:
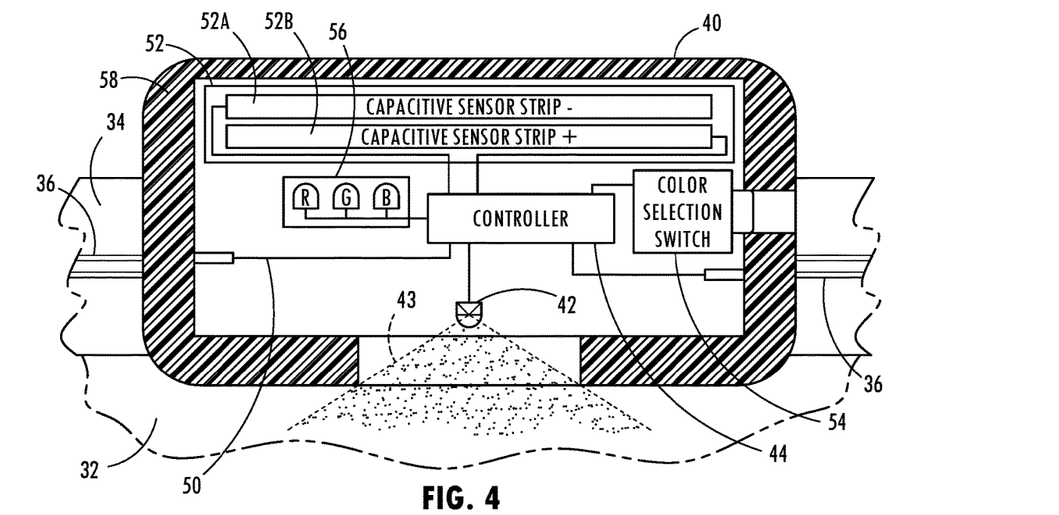
FIG. 4 is an enlarged cross-sectional view of a tab portion of the file folder taken through line IV-IV of FIG. 3 showing electrical circuitry and components formed therein.

The tab 40 is further illustrated in FIGS. 3 and 4 having various components formed on the tab 40 and encased within an overmold material 58. The tab 40 may include a first light source 42 which may include one or more light-emitting diodes (LEDs) configured to illuminate an area proximate to the storage module 30, such as the storage region 33 within the hanging storage module 30. In the embodiment shown, the first light source 32 is shown illuminating light 43 downward from the tab 40 towards the storage region 33 such that a user may view the contents within the storage region 33 of the hanging storage module 30. The first light source 42 is shown positioned on a lower surface of the tab 40 to project a beam of light 43 downward from between the two upper support arms 34 into the lower storage region 33 between first and second walls 32A and 32B. In addition, the tab 40 has a second light source 56 which may include one or more LEDs. In the embodiment shown, the second light source 56 includes an RGB light source that generates red, green and blue colored light and may generate mixtures thereof to produce different selectable light colors or hues. The second light source 56 may illuminate the tab 40 with a certain light color and light intensity such that the tab 40 is visibly illuminated and readily identifiable.

The tab 40 includes electrical circuitry for receiving electrical power supplied by the electrical circuit traces or contacts 36 within the support arm 34 connected thereto. A first proximity sensor 52 is shown provided near the top side portion of tab 40. The first proximity sensor forms a first switch for sensing a user activation input and controlling activation of the first light source 42. The first proximity sensor 52 may be configured as a capacitive sensor for sensing contact or close proximity of a person (e.g., finger) relative to the tab 40. The first proximity sensor 52 may be a capacitive sensor that includes first and second capacitive sensor electrode strips 52A and 52B powered and arranged for forming a capacitive sensor field. The first and second capacitive sensor electrode strips 52A and 52B may be configured to have conductive fingers arranged so that fingers of the first electrode strip 52A are interdigitated with fingers of the second electrode strip 52B. The first proximity sensor 52 may be configured as a capacitive sensor generating a capacitive field. The first proximity sensor 52 provides a sense capacitive activation field that may sense a user (person) in contact or close proximity to the tab 40. The sense activation field of the first proximity sensor 52 is a capacitive field in the exemplary embodiment and the user's finger and hand have electrical conductivity and dielectric properties that cause a change or disturbance in the sense activation capacitive field as should be evident to those skilled in the art. However, it should be appreciated by those skilled in the art that additional or alternative types of proximity sensors can be used, such as, but not limited to inductive sensors, optical sensors, temperature sensors, resistive sensors, the like, or a combination thereof. It should further be appreciative that other types of sensors or switches including mechanical switches may be employed according to further embodiments. The first proximity sensor 52 may be activated by a user to turn on the first light source 42 to thereby illuminate light 43 within the corresponding storage module 30 such that a user may view the contents stored within the illuminated storage module 30.

In addition, the tab 40 further includes a color selection switch 54 which allows a user to select a color of light illumination of the tab 40 that is generated by the second light source 56. A user may activate the color selection switch 54 to change to a different color light. The color selection switch 54 may include a second proximity sensor and may be configured as a capacitive switch or other proximity switch and may be located along a side or edge of the tab 40. Alternatively, the color selection switch may be a mechanical switch selector. The various components within the tab 40 may be encapsulated and protected with an overmold material 58 such as optical grade silicone which may include one or more transparent portions for light to illuminate therethrough.

Figure 5:
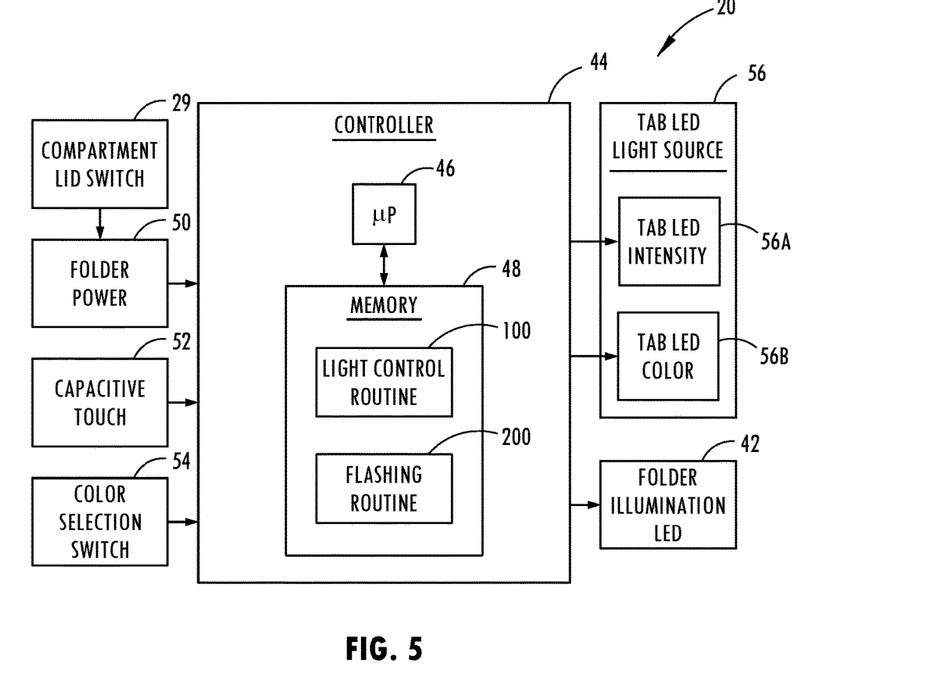
FIG. 5 is a block diagram illustrating the file folder light illumination system employed on the tab.

Referring to FIG. 5, the light illumination control for the storage compartment 20 is further illustrated, according to one embodiment. In the embodiment shown, the storage compartment 20 includes a controller 44 generally shown configured having a microprocessor 46 and memory 48. Stored within memory 48 and executed by the microprocessor 46 is a light control routine 100 and a flashing light routine 200. Light control routine 100 controls illumination of the first light source 42 provided in the tab. The flashing light routine 200 controls the flashing of the tab illumination second light source 56. The controller 44 may include any analog and/or digital control circuitry for processing various inputs and controlling the light sources as outputs according to the routines 100 and 200. In the embodiment shown, the controller 44 receives electrical power 50 from the vehicle power supply when the compartment lid switch 29 is closed when the lid is in the open position. The electrical power is supplied to the hanging file folder via electrical circuitry extending across the support arms and tab 40. In addition, the capacitive touch sensor 52 provides a signal to the controller 44 indicative of whether a user is in contact or close proximity to the sensor for purposes of controlling the first light source to illuminate the storage region (e.g., pocket) of the storage module. Further, the color selection switch 54 supplies a signal to the controller 44 indicative of a user input for inputting a tab light color selection. The controller 44 process the various inputs and controls the light illumination provided to the file folder by the light illumination LED 42 and also controls the intensity 56A and color 56B of the tab light source 56.

Figure 6:
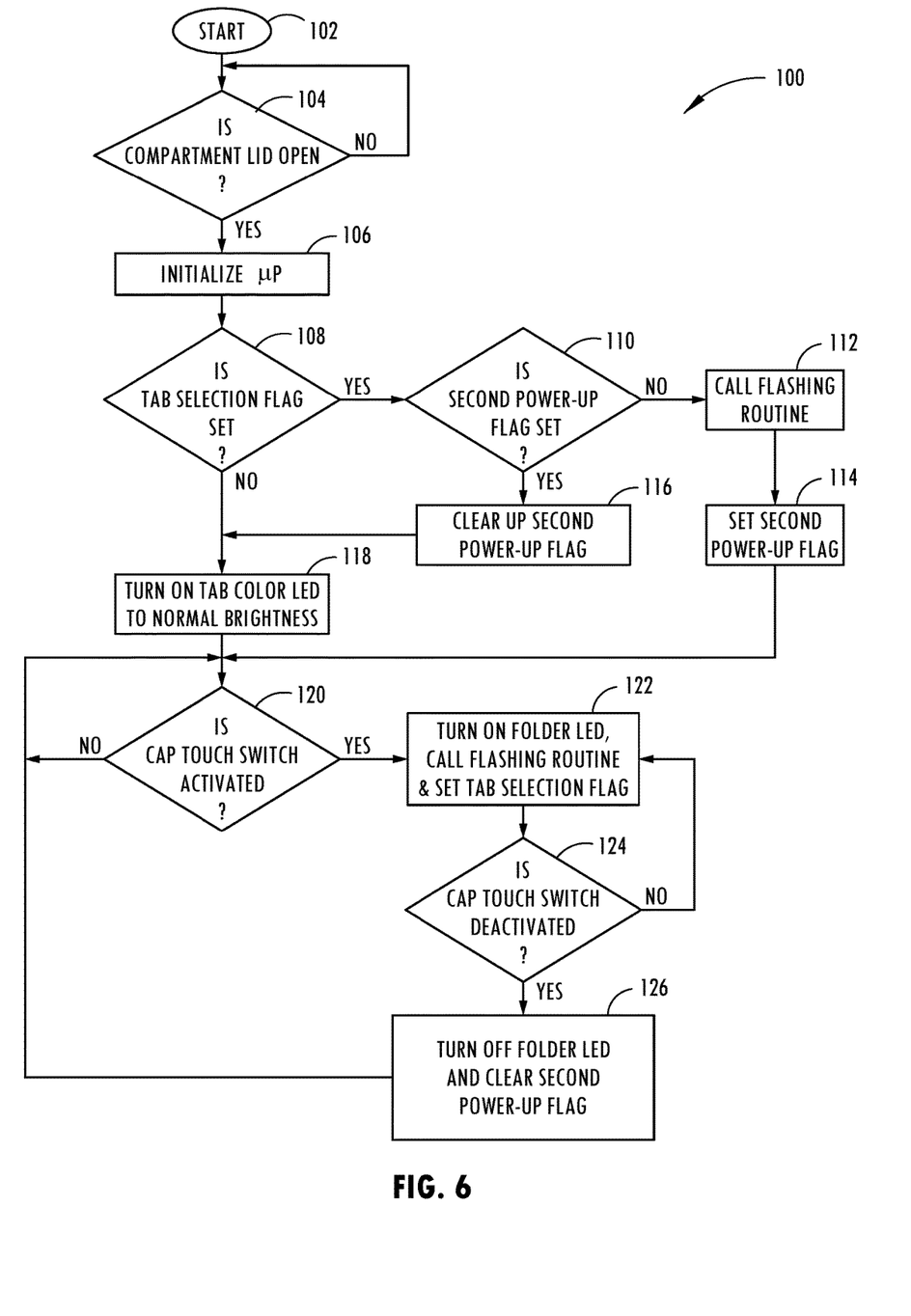
FIG. 6 is a flow diagram illustrating a lighting control routine for controlling illumination on the file folder tab, according to one embodiment.

The light control routine 100 is illustrated in FIG. 6 beginning at step 102 and proceeds to decision step 104 to determine if the storage compartment lid is in the open position and, if not, returns to start. Electrical power is supplied to the support rails and thus the tab preferably only when the compartment lid is in an open position as determined by switch 29. If the compartment lid is in the open position and thus electrical power is supplied to the tab, routine 100 proceeds to step 106 to initialize the microprocessor and then proceeds to decision step 108 to determine if the tab selection flag is set. The tab selection flag indicates whether the tab was touched when the compartment lid was last opened. If the tab selection flag is set, routine 100 proceeds to decision step 110 to determine if the second power-up flag is set and, if so, clears the second power-up flag at step 116. The second power-up flag indicates whether the tab was touched and therefore illuminated on the prior power-up when the compartment lid was last opened and a tab was touched. If the second power-up flag is not set, routine 100 proceeds to step 112 to execute the flashing subroutine and then to step 114 to set the second power-up flag before proceeding to decision step 120. Once the second power-up flag is cleared or if the tab selection flag is not set, routine 100 proceeds to step 118 to turn on the tab color LED light source to a normal brightness or intensity. Thereafter, routine 100 proceeds to decision step 120 to determine if the capacitive touch switch is activated and, if not, waits for activation of the switch. If the capacitive touch switch is activated, routine 100 proceeds to step 122 to turn on the file folder LED, to call the flashing routine, and to set the tab selection flag. Next, at decision step 124 routine 100 determines if the capacitive touch switch is deactivated and, if not, returns to step 122. If the capacitive touch switch is deactivated, routine 100 proceeds to step 126 to turn off the folder LED light source and clears the second power-up flag.

Figure 7:
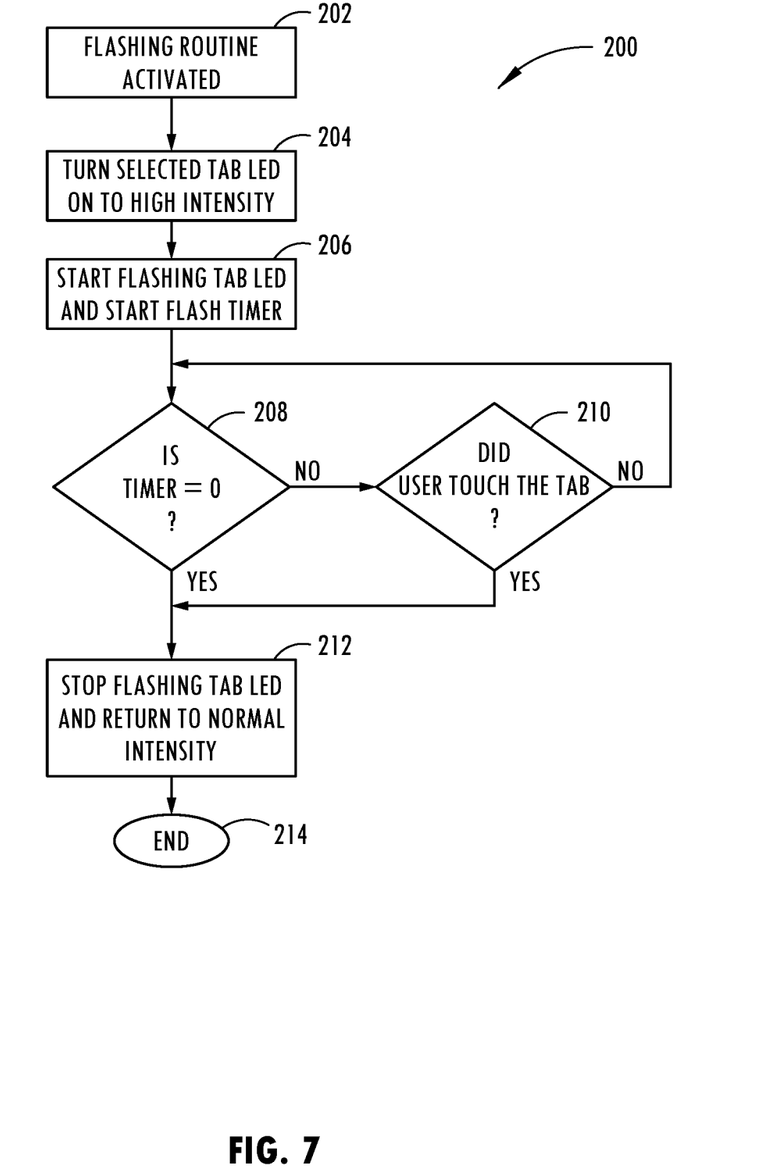
FIG. 7 is a flow diagram illustrating a routine for controlling the tab illumination lighting to flash, according to one embodiment.

The flashing routine 200 is illustrated in FIG. 7 beginning at step 202 when the flashing routine is activated. The flashing routine 200 is activated for a time period when the storage compartment lid is sensed in the open position to control the second light source on the tab to repeatedly flash light to indicate the file folder last utilized and to thereby draw the attention of the user. This enables the user to readily notice the storage module that was last utilized which is advantageous in the event the user is looking to access the same storage module such as to insert contents into the file that were recently removed therefrom. Routine 200 proceeds to step 204 to turn the selected tab LED light source on high intensity and then to step 206 to start flashing the tab LED and to start the flash timer. The timer may be set for a fixed time period, such as ten seconds, according to one example. Next, at decision step 208, routine 200 determines if the flash timer has timed out and, if not, proceeds to decision step 210 to determine if the user touched the tab. If the user did not touch the tab, routine 200 returns to step 208. If a user touched the tab or if the timer expired, routine 200 proceeds to step 212 to stop flashing the tab LED and to return to normal light intensity. Thereafter, routine 200 ends at step 214.

Accordingly, the storage compartment 20 advantageously provides for an electrically powered storage compartment 20 that supports and powers one or more hanging file folders or other hanging storage modules 30 within a vehicle 10. The storage modules 30 advantageously include electrical circuitry and a tab 40 comprising a first light source and user input sensor such that the light source may illuminate at least a portion of the storage module when the user input sensor detects a person in contact or close proximity. Further, the tab 40 may be illuminated with a second light source to enable a user to quickly locate a particular storage module 30. Accordingly, the storage compartment 20 is particularly useful in a vehicle 10 to allow organized storage and access to items stored within the storage modules 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage compartment comprising:
   a compartment;
   a hanging storage module supported on a support structure in the compartment and electrically coupled to a power supply, the hanging storage module comprising:
   a storage pocket;
   a support arm connected to the pocket and configured to be supported on the support structure; and
   a tab comprising a light source and a user input sensor, wherein the light source illuminates the pocket when the user input sensor detects a user input.

2. The storage compartment of claim 1, further comprising electrical conductors provided on the support arms and electrically coupled to electrical contacts on the support structure.

3. The storage compartment of claim 1, wherein the storage module is a hanging file folder.

4. The storage compartment of claim 1, wherein the compartment is a storage compartment in a vehicle.

5. The storage compartment of claim 4, wherein the storage compartment is a center console of the vehicle.

6. The storage compartment of claim 1, wherein the user input sensor comprises a proximity sensor for detecting a person in close proximity to the tab.

7. The storage compartment of claim 6, wherein the proximity sensor comprises a capacitive sensor.

8. The storage compartments of claim 1 further comprising another light source located on the tab for illuminating the tab.

9. A vehicle storage compartment system comprising:
   a compartment having a support structure and power contacts; and
   a hanging storage module supported on the support structure in the compartment, the module comprising:
   a storage pocket;
   a support arm connected to the pocket and configured to be supported on the support structure;
   electrical circuitry coupled to the power contacts; and
   a tab comprising a light source and a user input sensor, wherein the light source illuminates at least a portion of the pocket when the user input sensor detects a user input.

10. The storage compartment of claim 9, wherein the module is a hanging file folder.

11. The storage compartment of claim 6, wherein the user input sensor comprises a proximity sensor for detecting a person in close proximity to the tab.

12. The storage compartment of claim 11, wherein the proximity sensor comprises a capacitive sensor.

13. A hanging storage module comprising:
   a storage pocket;
   a support member supporting the pocket and configured to be supported on a support structure of a storage compartment; and
   a tab comprising a light source and a user input sensor, wherein the light source illuminates the pocket when the user input sensor detects a user input.

14. The storage module of claim 13 further comprising electrical conductors configured to receive electoral power.

15. The storage module of claim 13, wherein the storage module is a hanging file folder.

16. The storage module of claim 13, wherein the module is located in a storage compartment in a vehicle.

17. The storage module of claim 16, wherein the storage compartment is a center console of the vehicle.

18. The storage module of claim 13, wherein the user input sensor comprises a proximity sensor for detecting a person in close proximity to the tab.

19. The storage module of claim 18, wherein the proximity sensor comprises a capacitive sensor.

20. The storage module of claim 13 further comprising another light source located on the tab for illuminating the tab.

* * * * *

UNITED STATES PATENT AND TRADEMARK OFFICE
CERTIFICATE OF CORRECTION

PATENT NO. : 10,449,907 B2
APPLICATION NO. : 15/227115
DATED : October 22, 2019
INVENTOR(S) : Dunham et al.

Page 1 of 1

It is certified that error appears in the above-identified patent and that said Letters Patent is hereby corrected as shown below:

In the Claims

Column 7;
Claim 1, Lines 8-9:
After "and" delete "configured to be".

Signed and Sealed this
Thirty-first Day of December, 2019

Andrei Iancu
*Director of the United States Patent and Trademark Office*